Figure 3:
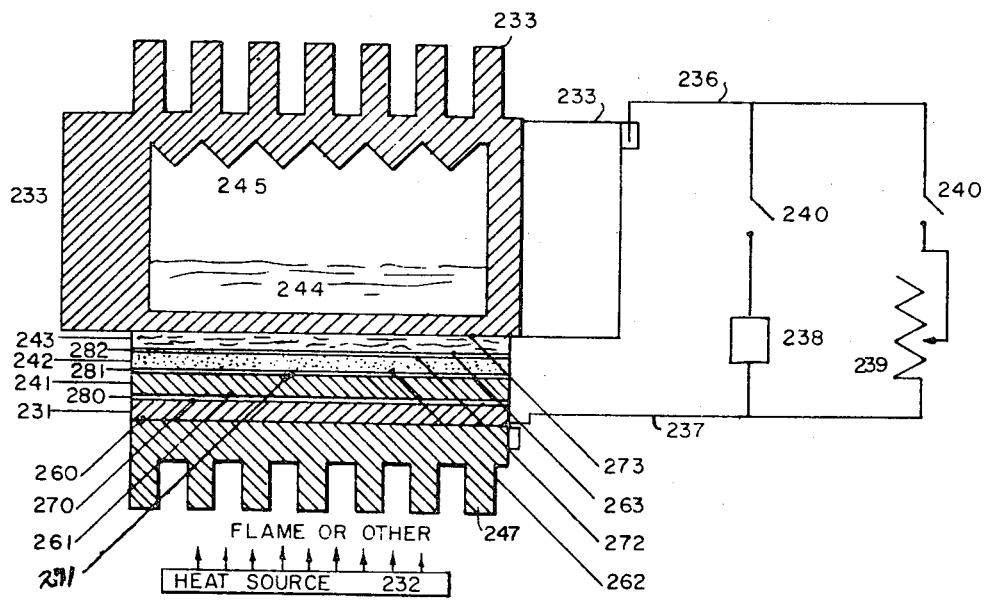

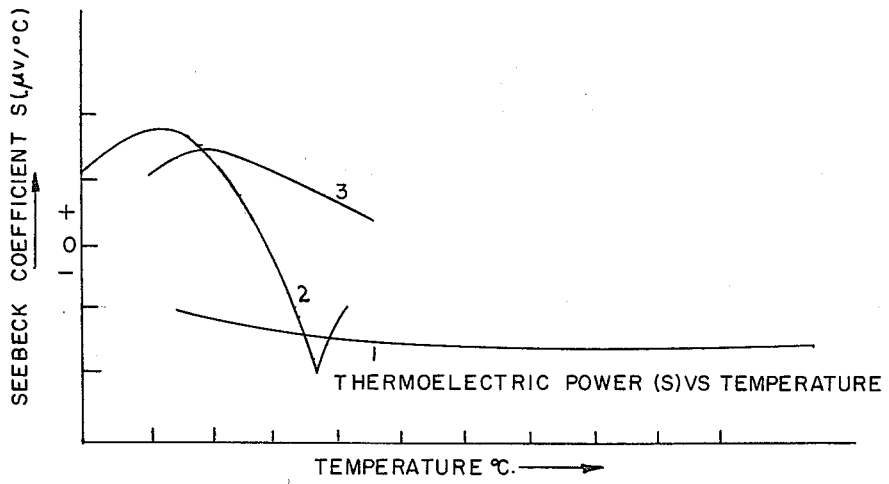
FIGURE I.
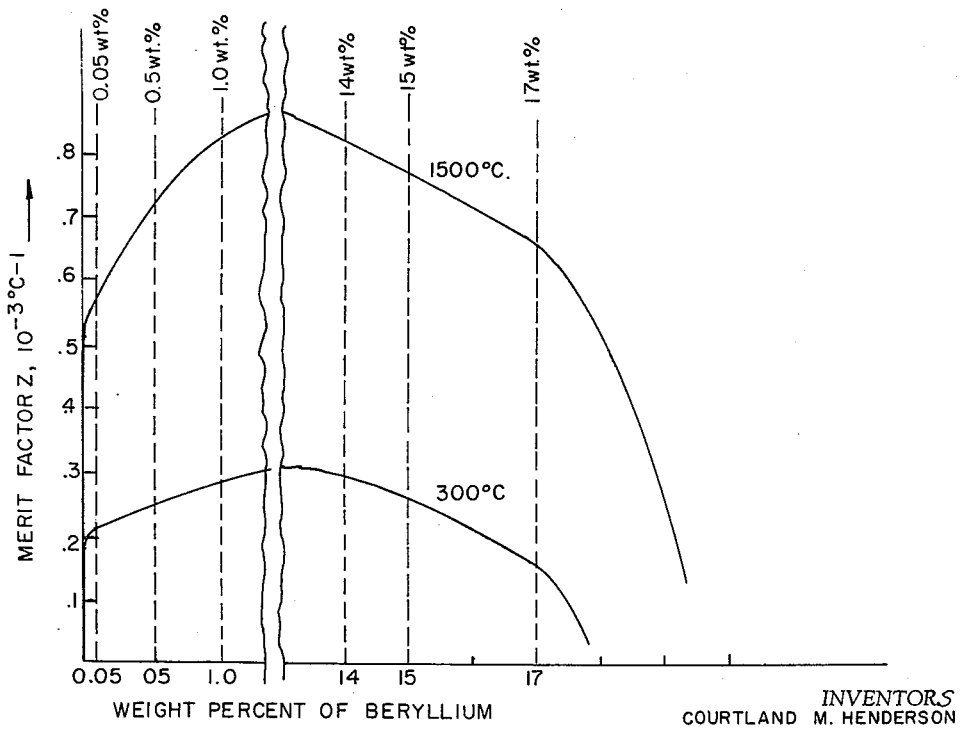
FIGURE 2.

March 12, 1963  C. M. HENDERSON ET AL  3,081,362
THERMOELECTRICITY
Filed June 9, 1961  5 Sheets-Sheet 2

INVENTORS
COURTLAND M. HENDERSON
BY DARREL M. HARRIS

ATTORNEY

March 12, 1963   C. M. HENDERSON ET AL   3,081,362
THERMOELECTRICITY
Filed June 9, 1961   5 Sheets-Sheet 3

FLOW OF HOT EXHAUST OR REACTOR MEDIA

INVENTORS
COURTLAND M. HENDERSON
DARREL M. HARRIS
BY
*Herman O. Bauermeister*
ATTORNEY March 12, 1963  C. M. HENDERSON ET AL  3,081,362
THERMOELECTRICITY
Filed June 9, 1961  5 Sheets-Sheet 4

INVENTORS
COURTLAND M. HENDERSON
DARREL M. HARRIS
BY
Herman O. Bauermeister
ATTORNEY March 12, 1963  C. M. HENDERSON ET AL  3,081,362
THERMOELECTRICITY Filed June 9, 1961  5 Sheets-Sheet 5

INVENTORS
COURTLAND M. HENDERSON
DARREL M. HARRIS
BY
*Herman C. Bauermeister*
ATTORNEY

United States Patent Office 3,081,362
Patented Mar. 12, 1963

3,081,362
THERMOELECTRICITY
Courtland M. Henderson, Xenia, and Darrel M. Harris, Dayton, Ohio, assignors to Monsanto Chemical Company, St. Louis, Mo., a corporation of Delaware
Filed June 9, 1961, Ser. No. 116,151
13 Claims. (Cl. 136—4)

The present invention relates to improved thermoelectric processes and compositions which are of utility for the direct conversion of heat to electricity. The invention also relates to methods of manufacturing the said compositions. The invention includes processes for generating electric power, as well as heating and cooling by the use of the said materials. The present invention also relates to the use of modified boron materials in dielectric (such as a capacitor), thermistor, transistor, rectifier and other semiconductor applications and devices which are of utility in the field of electronics.

While earlier investigators of boron materials have shown a knowledge of the use of such materials as thermocouples, these early compositions, like those of conventional thermocouples such as Chromel-Alumel or iron-constantan, exhibited poor power generative characteristics. This is indicated by the uniform lack of the use of prior art thermocouples as energy converters or power generators and Peltier cooling units. It is an objective of the present invention to provide unusually effective power generation and Peltier cooling units by means of special compositions of beryllium as a major modifier or dopant for boron.

The thermoelectric materials contemplated in the present invention are composed of boron having intimately dispersed therein specific proportions of beryllium and certain other elements. The beryllium is present at lower levels of concentration than stoichiometric ratios, e.g., beryllium diboride. The production of the present combinations of boron together with additive proportions of beryllium or other elements is accomplished by various means discussed herein, such as hot-pressing a mixture of elemental boron together with the desired proportions of the desired elements, or elements derived from compounds which (in hydrogen) produce boron with the desired elements being present to modify the boron in the specific proportions herein set forth. Thus, a beryllium halide compound such as the iodide compound has been found to be decomposed either alone, or in conjunction with diborane or boron trihalide at temperatures ranging from 400° C. to 3,000° C. to bring about the deposition of boron with beryllium in any desired proportion. Similarly, the use of mixed halides of boron with decomposable hydrides or halides of doping elements (e.g., aluminum, titanium, iron, germanium, carbon, etc.) is employed to produce boron-beryllium thermoelectric materials of unique compositions for various power generation, heating, cooling and semiconductor applications.

It is also an advantage of the present invention that electrical and thermal leads capable of operating for long periods of time at temperatures above 1,000° C. in contact with boron have been made possible. The problem of maintaining ohmic type contacts with boron has been a major obstacle to past workers who tried to determine the thermoelectric properties of boron above 600° C. This investigation has shown that leads of various metals (e.g., titanium) or other materials (e.g., hafnium boride) can be attached, by the hot-pressing process discussed with other methods herein, to pure and doped boron pressed shapes to yield units capable of operating at very high temperatures, such as over 1,000° C., in air and other media. In air, the compositions of the invention have been found to be modified at high temperatures in that a protective film forms on the doped boron surface which protects it from further oxidation. A thin coating of non-conducting ceramic material such as zirconia, porcelain, alumina and other materials applied by conventional means (e.g., ceramic dipping and flame spraying) can also be used to protect both the electrical leads and the doped boron-beryllium elements.

In general, a second component which is in electrical and thermal contact, e.g., at the hot junction with the first member of beryllium modified boron is selected from the group consisting of carbon, copper, gold, silver, nickel, cobalt, iron, rhenium, vanadium, tungsten, molybdenum, rhodium, niobium, titanium, tantalum, ruthenium and the oxides, borides, carbides, silicides and nitrides of nickel, cobalt, iron, rhenium, vanadium, rhodium, niobium, titanium, tantalum, tungsten, molybdenum and ruthenium.

In a preferred embodiment of the invention, the said second element is characterized by an electrical conductivity and a thermal conductivity which are at least equal in magnitude to the respective electrical and thermal conductivities of the aforesaid boron-beryllium element. In the employment of the power generating combination of the herein described first and second elements, a cold lead or third component of various means such as wires, rods, bars and other conductors, electrically and thermally connect the respective elements to an external circuit.

It is an advantage of the present invention that boron-based materials, such as boron-beryllium as a binary, boron-lanthanum-beryllium and boron-titanium-beryllium as typical ternaries, and boron-carbon-hafnium, beryllium as a typical quaternary are useful as thermoelectric materials, e.g., for obtaining electricity from heat sources above 1,000° C., well above the top operating temperature for conventional materials such as indium arsenic phosphide and lead or bismuth selenides and tellurides.

Figure 8:
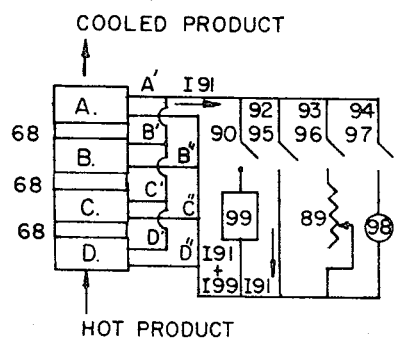
Figure 10:
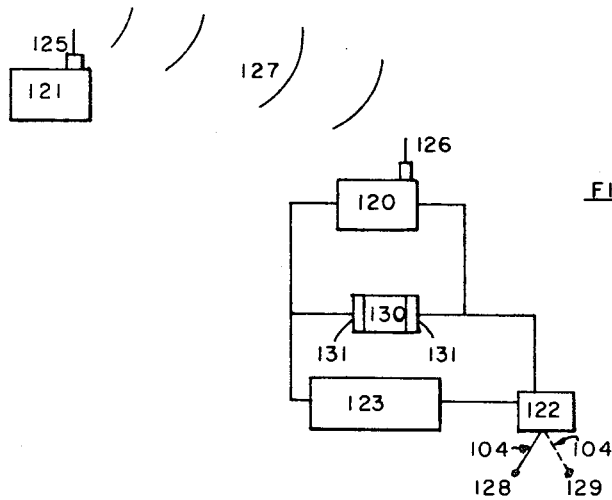
Figure 11:
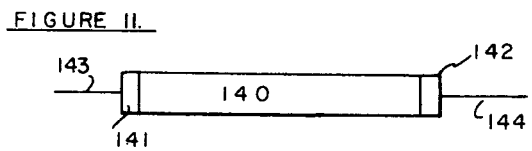
Figure 12:
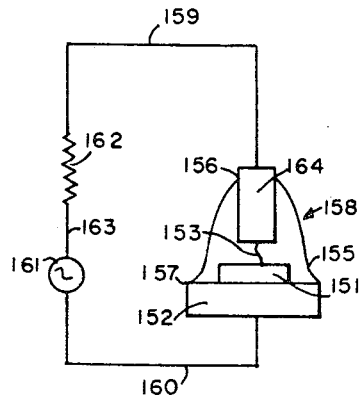

The drawings of this patent application show various specific embodiments and examples of the invention, and data illustrative of the present compositions. FIGURE 1 shows the Seebeck coefficient of a typical beryllium modified boron composition of this invention as compared with other thermoelectric materials for the same temperature range. FIGURE 2 shows the effect of beryllium content on the merit factor, Z, of various temperatures. FIGURES 3, 4, 5, 6, 7 and 9 illustrate various thermoelectric generating devices, while FIGURE 8 shows an electrical circuit used with a multiplicity of units. FIGURE 10 shows the use of boron-beryllium materials as a capacitor device for remote control purposes. FIGURE 11 illustrates the use of boron-beryllium materials in thermistors. FIGURE 12 shows the use of boron-beryllium materials for rectification purposes. Transistor applications are depicted for boron-beryllium materials in FIGURE 13. The use of beryllium-boron materials to recover heat in the form of electrical power and for cooling purposes in the processing of phosphorus are shown in FIGURES 8 and 14.

In the embodiment of the invention in which the beryllium-boron materials are used as a thermoelectric material, the present combination of beryllium-boron doped with carbon, aluminum, hafnium, magnesium, germanium, tin, phosphorus, titanium, zirconium, silicon, cobalt, manganese and the rare earths of type 4f are advantageously employed. These combinations are characterized by an unusually high stability of the Seebeck coefficient at elevated temperatures as shown, for example, in FIGURE 1 where the relationship between the thermoelectric effect (Seebeck coefficient, S) and the temperature is shown for a typical beryllium-boron material with 11% by weight beryllium and compared with lead selenide, element 2, and indium arsenic phosphide, element 3, as representative of the best prior art materials. In this relationship, it has been found that the beryllium-boron material typified here is useful as a thermoelectric power generating substance at temperatures far above those at which conventional metallic type thermoelectric generating compositions may be employed. For example, indium phosphide has been investigated as a high-temperature, power-generation material, but has been found to be ineffective at temperatures greater than 800° C. In contrast thereto, the present materials function as effective thermoelectric generator components at temperatures as low as 110° C. and are of particular utility at temperatures above 800° C. The present materials may therefore be used in power generation devices located in the motor exhausts, tail, wing and nose surfaces of missiles and rockets, in atomic energy reactor linings, in exhaust stacks of chemical reactors, in petroleum processing units, etc. Thus, in employing a beryllium-boron based thermoelectric combination of the present invention in the wall of an atomic energy reactor or in various types of chemical reactors, it is found that the removal of heat through this material serves to generate electricity which is usable for prime power generation and also for the purpose of cooling the walls of such equipment. It is well known that there are numerous problems in the chemical, nuclear, missile and space craft fields where it is advantageous to cool the walls and exhaust stacks of chemical and nuclear reactors desirably by some means other than conventional liquid or gaseous systems. It is possible by the present invention using beryllium-boron compositions to simultaneously accomplish power generation and safe cooling of linings of chemical reactors and exhaust gas stacks, rocket chambers and exhaust nozzles, hot surfaces and bearings of space craft.

The present materials therefore constitute a solid state electronic device for lowering the temperature of reactor linings, thus reducing the use of liquids and gases which can be dangerously volatile in such applications. The present solid state cooling devices of this invention also permit the location of specially shaped coolant members, particularly in critical hard-to-cool sites such as in chemical reactors, hot mechanical bearings or high-temperature electronic devices. A further advantage in the use of such solid state cooling devices is that they offer self-regulating, self-powered, smooth-temperature control which minimizes thermal stresses and maintenance of wall linings as well as a minimum of instrumentation for control purposes. In addition, it is noteworthy that there are no moving parts and little maintenance requirements in the use of these materials.

Figure 5:
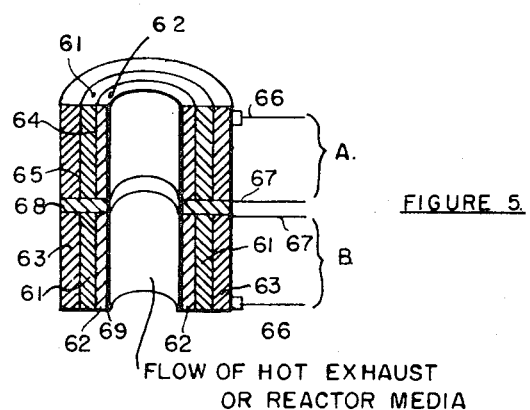
Figure 7:
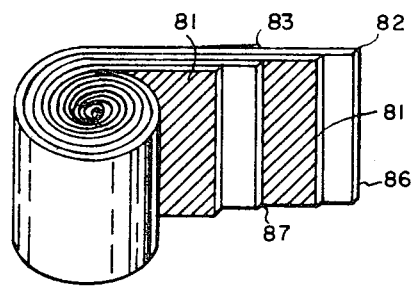
Figure 9:
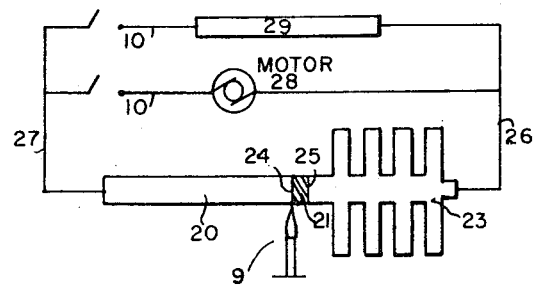

The individual thermoelectric generating, and also solid-state cooling elements employed in the present invention are founded upon thermoelectric units of the aforesaid beryllium-boron material in which beryllium is present in the boron. With beryllium, the range is generally from 0.05% to 17% by weight beryllium in boron to form a thermoelectric unit. More preferably, the range of beryllium content in boron is from 0.5% to 15% by weight. Still more preferably, the beryllium content is from 1.0% to 14% by weight in boron to form the most effective thermoelectric units. Such units are comprised of the boron-beryllium component, with each end thereof joined to highly conducting leads by fusion under pressure or hot-pressing methods. An example of such an electrically and thermally conducting lead material is graphite, a form of carbon. This thermoelectric unit may be utilized per se, for example, as concentric outer and inner cylinders of carbon in contact with an intermediate concentric layer of the beryllium-boron material as shown in FIGURE 5. Another modification is to join plate-like boron-beryllium elements to carbon or other conducting contacts in a sandwich-like configuration as shown in FIGURES 3 and 9. Multiple junctions may be made by conventional means using concentric and/or sandwich-type units joined in series electrical connections or parallel electrical connections. Various shaped objects, for example, liners for high temperature exhaust stacks of atomic reactors may similarly be provided in this manner. In this relationship, the thermal and chemical stability of the boron-beryllium combination is of particular utility. A chemical vessel may also, for example, be provided with sandwich or concentric type thermoelectric units made of beryllium-boron thermoelectric generator materials.

*Example 1*

As shown in FIGURE 5, the boron-beryllium material 61 is joined to conducting material 62 and 63 which consist, for example, of carbon, nickel or beryllium oxide to form individual thermoelectric units. The inner conducting material 62 is joined to the inner lining 69 of a refractory metallic, cermet or ceramic conducting type, or element 62 may itself serve as the inner lining. For example, carbon, nickel alloys and beryllium oxide make excellent corrosion resistant linings for chemical reactors. Furthermore, these materials have desirable thermal and electrical conductivities useful in this relationship.

In FIGURE 5, elements 64 and 65 represent the junctions of the conducting layers 62 and 63 respectively with the boron-based element 61. Elements 66 and 67 are the electrical leads connecting elements 62 and 63 respectively to external circuits A and B.

It is often desirable to employ several individual units in series or parallel. In such instances, an electrical and thermal insulator 68 is used between the individual sections.

The present thermoelectric units can be used to form the walls of reactors, or units of these materials can be embedded a suitable distance below the surface of the wall. Such units which include boron-based material may be placed in contact with the innermost wall of the vessel by mechanical means or may be deposited in place, for example, by flame-spray coating methods. Thus, there is obtained a combination generator-cooling unit as a part of a chemical reactor vessel. When the unit of FIGURE 5 using the aforesaid materials is subjected to heat at the inner junction 64 of the boron-based material 61 and its outer junction 65 is cooled, electrical energy is generated by the unit which can be utilized as an electrical power source section A. This thermoelectric power generation absorbs heat through the hot inner surface of the lining 69 of the reactor wall, thus cooling it. Automatic temperature control results when the cooling section B is placed upstream (or near the hottest section of the reactor) of the power generator unit A. Various combinations of thermoelectric units, through proper electrical switching, may be used entirely for power generation or cooling or any power-cooling combinations.

If desired, greater cooling capacity can be produced by utilizing power from an external source as shown, for example, in FIGURE 8 where power source 99 may be polarized to oppose current $I_{91}$, or to flow with it forming a combined current $I_{91}+I_{99}$, as desired. It is understood that by reversing current flow in a thermoelectric cooling unit through application of an external power source that heating of the reactor walls prior to start up or for preheating reactants may also be achieved.

FIGURES 3, 4, 5, 6, 7 and 9 of the present patent application illustrate more specific embodiments and examples of the invention.

*Example 2*

FIGURE 9 shows a thermoelectric power production unit in which the boron-beryllium material (element 21)

with about 12 weight percent of beryllium, which may optionally contain additional doping elements dispersed with the boron as the matrix, is joined to conducting electrical leads 20 and 23. Such leads, or junctions, may be conventional conductive metals and compounds such as iron, nickel alloys or beryllium oxide. The junction is made by fusing the metal or compound into the beryllium-boron material, or by spraying (e.g., flame or plasma) or plating (under vacuum or atmospheric conditions, preferably with an inert atmosphere) on the faces 24 and 25 of the thermoelectric material 21 followed by fusing or pressure contacting with materials of 20 and 23 with faces 24 and 25 respectively. External circuit contacts are then made by conventional means such as soldering, welding or pressing of external circuit conductors to leads 26 and 27. In order to obtain an electrical current from the thermoelectric unit 21, end 20 of this boron-beryllium material is heated by heat source 9, while the other end 23 is cooled. This produces a temperature differential across faces 24 and 25 which results in a conductor 20 becoming positively (e.g., boron-beryllium used alone or with certain dopants) or negatively charged according to the doping materials used in the beryllium-boron. The collection of positive and negative charges at faces 24 and 25 generates electrical power, i.e., current and voltage at a substantial wattage, which, when, connected through leads 26 and 27 to external loads 28 and 29 through switches 10, can perform useful work. With unit 21 of dimensions of 1 square centimeter cross section operating between 1500° C. and 500° C. and with a Z merit factor of $0.31 \times 10^{-3}/°C.$, a power output of 11 watts is obtained.

Highly useful thermoelectric power generation devices are also obtained when doped boron-beryllium compositions are employed. For example, when element 21 consists of 88.9 weight percent boron, 0.04 weight percent carbon and 11.06 weight percent beryllium, and a temperature differential of 700° C. is maintained across faces 24 and 25, a power flux of 5.2 watts/cm.$^2$ is obtained. Higher power output is obtained when specific, select materials are used for elements 20 and 23 in a manner to augment the power generation characteristics. That is, when the heat source is located at or near element 24, it is important that element 20 be a p-type conductor, such as Chromel, while element 23 should be an n-type, such as carbon. In this manner, the smaller but valuable thermoelectric effect of the leads is added to the power output from the boron-based materials. For example, when elements 20 and 23 are selected with the polarity described above, the power output for the device is thermally more efficient than when the leads of reversed polarity to that presecribed are used.

A further important aspect of the generator device shown in FIGURE 9 is that elements 24 and 25 may be formed by partially diffusing elements 20, 21 and 23 to form junctions or interfaces which exhibit a gradual or gradated change in thermoelectric properties for a traverse from right to left from element 23 (i.e., carbon) to a combination of carbon with boron-titanium-beryllium at element 25 and then to boron-titanium-beryllium in a single body, element 21. Similarly, the thermoelectric properties and composition changes for a further continuation of a right to left traverse from element 21 (boron-titanium-beryllium) to a combination of boron-titanium-beryllium with constantan. The use of gradated junctions such as these, which are readily fabricated by hot pressing, is advantageous in overcoming junction problems of low strength and poor thermal and electrical characteristics.

The availability of n- and p-type boron-based materials permits wide flexibility in the design and use conditions for thermoelectric generators made of these compositions. When using n-type boron-beryllium, other component materials may be used as the p-type element, such as doped carbon-boron.

In addition to the above direct use of the boron-beryllium thermoelectric material, another field of application is in combinations of this unique high-temperature product with lower-temperature thermoelectric materials.

Example 3

FIGURE 3 shows a thermoelectric power generator in which high-temperature boron-beryllium material 231 (15 weight percent beryllium) is connected thermally and electrically in series with lower-temperature thermoelectric materials 241 (for example, indium arsenic phosphide), 242 (lead telluride) and 243 (bismuth selenide). By controlling the thickness of such typical materials 241, 242 and 243 with the boron-beryllium product, the thermal gradient across each material can be controlled and optimized. In this process, the peak or optimum efficiency for each material can be utilized. In FIGURE 3, showing a cross section of the thermoelectric device, heat from combustion 232, chemical waste heat, nuclear or other (e.g., solar) sources is directed through a hot junction component 247 to heat junction 260. Through the use of refractory metals or compounds (e.g., nickel metal and other heat resistant metals and alloys, or beryllium oxide) for element 247, heat sources well in excess of 1,000° C. can be used to heat the junction 260. Due to the low thermal conductivity of the boron-beryllium material, the temperature at the junction 280 between materials 231 and 241 can be maintained at a desirable lower (e.g., 500–600° C. as indicated by the temperature versus Seebeck coefficient relationship in FIGURE 1) temperature where material 241 (e.g., indium arsenic phosphide) most effectively operates. Similarly, by controlling the thickness of the layer of material 241, the temperature at the barrier 281 between materials 241 and 242 can be dropped to a still lower temperature (e.g., about 350° C.) where lead telluride or a similar material operates at peak efficiency. Finally, the cold lead component 233, consisting of a central hollow cylinder of high thermal and electrical conductivity, is partially filled with a condensable liquid 244 (e.g., water, mercury, etc.). This condensable liquid maintains a nearly constant temperature for junction 273 through evaporation of vapor from the liquid 244. The vapor condenses on cooled (by radiation, conduction and/or convection) top portions of component 233 and at surface 245 and on the side walls, thereby releasing heat to the finned or otherwise cooled portion 233 of the generator unit. Diffusion barriers 280, 281 and 282 (which lattermost is the junction between 242 and 243), such as nickel, copper, beryllium oxide or other materials, prevent migration of the boron or its modifying elements from one layer to another.

Example 4

Compositions of boron-beryllium with various elements or combinations thereof that are useful for high temperature thermoelectric power generation and cooling purposes are presented below. These same compositions are also useful for other semiconductor applications and devices, such as capacitors, dielectrics, thermistors, transistors and rectifiers. In this table, the small "$x$" represents weight percent for concentrations of additive elements for the weight percent of the broad range, and preferred concentration range. For the column headed "Compositions," the small "$y$" indicates the weight percent of beryllium as defined in the ranges above, e.g., broadly 0.05 to 17% and "$x$" represents weight percent of the additional additives. For example, in the first horizontal line of Table I, the material $BBe_yLi_x$ has the limiting formulae in which the beryllium content ranges from 0.05 to 17 weight percent and the lithium from $1 \times 10^{-13}$ to 18 weight percent.

TABLE I

*List of Elements by Periodic Groups Which May Be Added to Boron-Beryllium to Yield Boron-Beryllium Materials of Useful Power Generating and Cooling Properties*

| Element | Periodic Group | Weight Percent Elements | | Compositions |
|---|---|---|---|---|
| | | Broad Range | Preferred Range | |
| Li | I-A | $1 \times 10^{-13}$ to 18 | $1 \times 10^{-6}$ to 15 | $BBe_yLi_x$ |
| Ag, Au, Cu | I-B | $1 \times 10^{-13}$ to 20 | $1 \times 10^{-6}$ to 18 | $BBe_yAg_x$, $BBe_yAu_x$, $BBe_yCu_x$ |
| Sr, Ca, Ba | II-A | $1 \times 10^{-13}$ to 0.04 | $1 \times 10^{-6}$ to 0.04 | $BBe_ySr_x$, $BBe_yCa_x$, $BBe_yBa_x$ |
| Zn | II-B | $1 \times 10^{-13}$ to 25 | $1 \times 10^{-6}$ to 20 | $BBe_yZn_x$ |
| Al, Ga, In | III-A | $1 \times 10^{-13}$ to 25 | $1 \times 10^{-6}$ to 20 | $BBe_yAl_x$, $BBe_yGa_x$, $BBe_yIn_x$ |
| RE,* Y, Sc, Ac | III-B | $1 \times 10^{-13}$ to 25 | $1 \times 10^{-6}$ to 20 | $BBe_yRE_x$,* $BBe_yY_x$, $BBe_ySc_x$, $BBe_yAc_x$ |
| C, Sn, Pb, Ge, Si | IV-A | $1 \times 10^{-13}$ to 0.04 | $1 \times 10^{-6}$ to 0.04 | $BBe_yC_x$, $BBe_ySn_x$, $BBe_yPb_x$, $BBe_yGe_x$, $BBe_ySi_x$ |
| Ti, Zr, Hf | IV-B | $1 \times 10^{-13}$ to 0.04 | $1 \times 10^{-6}$ to 0.04 | $BBe_yTi_x$, $BBe_yZr_x$, $BBe_yHf_x$ |
| P, Sb, As, Bi | V-A | $1 \times 10^{-13}$ to 20 | $1 \times 10^{-6}$ to 18 | $BBe_yP_x$, $BBe_ySb_x$, $BBe_yAs_x$, $BBe_yBi_x$ |
| Nb, Ta, V | V-B | $1 \times 10^{-13}$ to 25 | $1 \times 10^{-6}$ to 20 | $BBe_yNb_x$, $BBe_yTa_x$, $BBe_yV_x$ |
| S, Se, Te, Po | VI-A | $1 \times 10^{-13}$ to 20 | $1 \times 10^{-6}$ to 18 | $BBe_yS_x$, $BBe_ySe_x$, $BBe_yTe_x$, $BBe_yPo_x$ |
| Cr, Mo, W | VI-B | $1 \times 10^{-13}$ to 25 | $1 \times 10^{-6}$ to 20 | $BBe_yCr_x$, $BBe_yMo_x$, $BBe_yW_x$ |
| Mn, Re | VII-B | $1 \times 10^{-13}$ to 25 | $1 \times 10^{-6}$ to 20 | $BBe_yMn_x$, $BBe_yRe_x$ |
| Co, Fe, Ni, Ru, Ir, Pd, Rh | VIII | $1 \times 10^{-13}$ to 25 | $1 \times 10^{-6}$ to 20 | $BBe_yCo_x$, $BBe_yFe_x$, $BBe_yNi_x$, $BBe_yRu_x$, $BBe_yIr_x$, $BBe_yPd_x$, $BBe_yRh_x$ |

*RE includes lanthanide and actinide series.

In this group of additives or dopants which are combined singly or in combination with beryllium-boron, the preferred members as discussed above with respect to amounts, are:

Carbon, aluminum, zirconium, magnesium, germanium, tin, phosphorus, titanium, hafnium, silicon, cobalt, manganese and the rare earths of type 4f.

However, the invention also contemplates certain other compositions as shown in Table I, with specific regard to proportions, both broadly and narrowly. Thus, a grouping of the elements is that the preferred ranges of elements are present at from $1 \times 10^{-6}$ to 15 weight percent for Li;
$1 \times 10^{-6}$ to 18 weight percent for Ag, Au, Cu, Pb, P, Sb, As, Bi, S, Se, Te and Po;
$1 \times 10^{-6}$ to 20 weight percent for Sr, Ca, Zn, Al, Ga, In, RE, Y, Sc, Nb, Ta, V, Cr, Mo, W, Mn, Re, Co, Fe, Ni, Ru, Ir, and Pd;
$1 \times 10^{-6}$ to 0.04 wt. percent for C, Ge, Ti, Hf, Zr, Sn and Si.

The broad range of proportions includes the range of additives from $1 \times 10^{-13}$ to 18 weight percent for Li;
$1 \times 10^{-13}$ to 20 weight percent for Ag, Au, Cu, Pb, P, Sb, As, Bi, S, Se, Te and Po;
$1 \times 10^{-13}$ to 25 weight percent for Sr, Ca, Zn, Al, Ga, In, RE, Y, Sc, Nb, Ta, V, Cr, Mo, W, Mn, Re, Co, Fe, Ni, Ru, Ir, and Pd;
$1 \times 10^{-13}$ to 0.04 wt. percent for C, Ge, Ti, Hf, Zr, Sn and Si.

Combinations of two or more addition elements with beryllium-boron are also useful as high temperature thermoelectric power generation and Peltier cooling materials. Useful compositions of such combinations are governed by the above limitations for individual elements in that they must be present in concentrations greater than $1 \times 10^{-13}$ weight percent, but not more than a total of 48 weight percent, in which the ratio of additive elements from Table I may be varied within such limitation.

In one embodiment of the invention a segmented thermoelectric power generating unit is constructed from four different thermoelectric segments; elements 231, 241, 242 and 243 which can also be represented by FIGURE 3. These segments consist of doped beryllium-boron compositions which are joined into a unitary body. For example, in a structure like that shown in FIGURE 3, element 231 is made from 10 weight percent beryllium in boron to which has been added 0.04 wt. percent carbon; element 241 is composed of 11 weight percent beryllium in boron doped with 0.03 weight percent carbon and with 0.04 weight percent titanium; element 242 consists of 15 weight percent beryllium in boron to which has been added 0.03 weight percent germanium and element 243 consists of a high Z factor type lead selenide. When this unit is operated over a temperature range 1300° C. at the hot junction (element 260), and 110° C. at the cold junction (element 273), the unit produces 8 watts per square centimeter of cross section perpendicular to the vertical flow of heat from element 247 to element 233.

The individual segments or the cascaded units are made by inserting a hot junction component, element 247, consisting of a typical heat resistant alloy of 76 weight percent iron, 23 weight percent chromium, and 5 weight percent aluminum into a graphite-boron nitride-lined die, then charging enough of the mechanically blended 10 weight percent beryllium in boron plus 0.03 weight percent carbon powder mixture on top of element 247. A male die plunger mechanically compacts this powder mixture 241 on top of element 247. Next, a thin layer of powdered silicon carbide is charged on top of element 241 and this powder compacted by a stroke of the male die to form a barrier, element 280. Next, the previously mentioned powdered composition for element 242 is charged on top of the last mentioned element 280 and this material is compressed with a stroke of a male die plunger. A second barrier, element 281, consisting of powdered nickel is then formed on top of element 241 by repeating the process used to form element 280 referred to above. The third thermoelectric segment, element 242, is formed by charging the aforesaid powder compositions for this element on top of the last diffusion barrier and repeating the compaction process. Then the three thermoelectric elements, barriers and hot junction components are formed into a unitized element by placing the assembly, while still in the graphite die, into an induction coil assembly. This aforesaid assembly of elements 247, 231, 241, 242, 243, 280, 281 and 282 is then heated to a temperature of about 1250° C. and held under a pressure of 2500 p.s.i. for thirty minutes. Following this, the now compacted assembly of elements 231, 241, and 242 is cooled while still within the graphite die and placed under a hopper which charges powdered lead selenide on top of the aforesaid unitized assembly of thermoelectric segments with barriers. The powdered lead selenide mixture is then compacted at room temperature under a pressure of 4000 p.s.i. for a period of ten minutes after which the now unitized assembly consisting of four segmented thermoelectric elements, three barriers and one hot junction component are removed from the die and coated with a silver cement. Element 233, the cold junction component is then attached to the aforesaid unitized assembly of several thermoelectric segmented layers by means of several spring loaded high temperature alloy toggle bolts which compress element 233 on top of the assembly of elements 247, 231, 241, 242, 243, 280, 281 and 282.

Similar devices consisting of several cascaded thermoelectric units with or without diffusion barriers between the segmented elements are manufactured by compacting the individual thermoelectric segments in separate dies under suitably high temperatures and pressures, such as 2000° C. and 1500 p.s.i. for element 231, 1800° C. and 1900 p.s.i. for element 241, 650° C. and 5000 p.s.i for element 242, and 50° C. and 5500 p.s.i. for element 243. The diffusion barriers, elements 280, 281 and 282 are then formed by consecutively placing a thermoelectric segment, element 231, in a die, charging powdered barrier elements 280, 281 and 282, metal or compounds such as nickel, molybdenum, silicon carbide and tungsten between segments and then compacting several segments and barrier elements with one stroke of a male die plunger. High quality junctions of the individual units of this type power generator are also obtained by other methods, using, for example, gravity loading of all the elements to form the device of FIGURE 3 and by cementing the various elements with silver solder and similar joining materials.

It is also found that two-element units yield excellent power outputs, for example, with one body of boron with 10% beryllium and with the second element being another thermoelectric body such as boron germanium (0.03% Ge), or indium arsenic phosphide, bismuth telluride and lead telluride. The two bodies are maintained in electrical contact, and with external leads to the load.

*Example 5*

It has been recognized that most combinations of elements, compounds and alloys which produce high Seebeck coefficients and voltage generating characteristics usually do not exhibit high power generation properties. It is apparent from the following known relationship for the thermal efficiency of thermoelectric devices that in addition to a high Seebeck coefficient, it is necessary to use materials which have low electrical resistivity and high thermal conductivity.

(I)

Efficiency of Thermoelectric Device $$= \frac{T_h - T_c}{T_h} \cdot \frac{[1 + Z(T_{av})]^{1/2} - 1}{[1 + Z(T_{av})]^{1/2} + \frac{T_c}{T_h}}$$

where for a typical power generating device of this invention as shown in FIGURE 9:

$T_h$ = temperature of the hot junction, element 24
$T_c$ = temperature of the cold junction, element 25
$T_{av}$ = average absolute temperature of $T_h$ and $T_c$
$Z = S^2/\rho K$ = merit factor
$S$ = Seebeck coefficient of element 21
$\rho$ = electrical resistivity of element 21
$K$ = thermal conductivity of element 21

From the above relation, it is also obvious that it is highly desirable to use materials which permit operating over a high temperature differential between the hot junction, element 24 of FIGURE 9, and the cold junction, element 25. Often, it is impractical to use cold junctions at temperatures substantially lower than room temperature or as provided by water cooling. It is highly desirable to use thermoelectric power generating materials which will operate satisfactorily at the highest possible temperature. The Seebeck coefficient, resistivity and thermal conductivity for most prior art thermoelectric materials tend to decrease with temperature. Further, as shown in the prior art, there are specific ranges of composition of thermoelectric materials which produce most effective and valuable thermocouples as represented by the specific and narrow ranges of composition used for chromel-alumel, copper-constantan, and other common thermocouples.

The present invention shows that specific ranges of beryllium-boron and also beryllium-boron with additive elements and compounds yield highly unique generating properties over a wide range of temperatures, particularly at very high temperatures. For example, in FIGURE 2 there is presented the Z, or merit factors, for boron-beryllium materials of this invention plotted versus beryllium content over a wide range of temperatures, 300° C. to 1500° C. Since, as shown in Equation I, the efficiency of power generation for a device is closely related to the merit factor ($S^2/\rho K$), this plot of Z versus beryllium content of boron-beryllium also represents the relative power generation capabilities of boron materials. Thus, FIGURE 2 shows that uniquely high merit factors, and therefore uniquely high power generation, is obtained from a device using boron-beryllium with a preferred range of 0.05 weight percent beryllium to 17 weight percent beryllium, a more preferred range of 0.5 weight percent and 15 weight percent beryllium, and a still more preferred range of 1.0 weight percent to 14 weight percent beryllium.

It has been found that high values occur for the material merit factors and power generation capabilities of devices based on ternary and quaternary boron-beryllium based materials in the range of 0.05 weight percent to 17 weight percent beryllium in boron material doped with one or more elements at additive levels shown in Table I of Example 4. For example, in a typical device as shown in FIGURE 9, with thermoelectric element 21 consisting of a ternary of 10 weight percent beryllium, 88 weight percent boron and 2 weight percent cerium produces 2 watts per square centimeter cross section area of element 21 when operating with a temperature differential of 1150° C. between junction elements 24 and 25. A further example of the high power generating capabilities of the materials and devices of this invention is seen in the operation of a device of the configuration shown in FIGURE 9 in which element 21 consists of a quaternary of 12 weight percent beryllium, 87.95 weight percent boron, 0.02 weight percent carbon, and 0.03 weight percent titanium. When this unit is operated with a temperature differential of 1450° C. between junction elements 24 and 25, the device produces 3 watts per square centimeter of cross section of element 21.

*Example 6*

Figure 6:
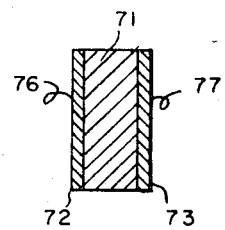

A remote control device using the present boron-beryllium material with 9 weight percent beryllium is shown in FIGURE 10. One of the advantages of using the material of this invention is that no mechanical or moving parts are required to change the impedance of the electrical circuit in the control device. For example, when using a 12.5 weight percent beryllium in boron material, element 71 of FIGURE 6 or element 81 of FIGURE 7 to produce the capacitor, element 130 of FIGURE 10, it is found that the capacitance of such a unit can be varied by a factor of 75 simply by varying the frequency of the voltage source from 100 cycles per second to 100,000 cycles per second. Element 121 in FIGURE 10 represents a radio signal sending device with aerial 125 transmitting radio energy 127 to receiving device 120 which consists of a radio receiving set 120 including a receiving aerial 126 connected to a conventional receiving circuit in which the boron-beryllium capacitor element 130 of the present invention, also 71 in FIGURE 6, is connected by leads 121 to cause the transmitted radio energy to build up or decrease the polarized voltage applied across the boron-beryllium capacitor 130. The variation of the frequency of the voltage applied across the capacitor 130 causes the dielectric constant of this material to change, thus varying the capacitance of the boron-beryllium material 130, and thereby the impedance of the circuits in unit 123 and 122. Unit 122 is typically a motor or electrically actuated lever switch and 123 is a radio circuit which it is desired to tune by remote control or which may be an electrical device for controlling unit 122. More specifically, motor circuit 122 is made to move switch or lever arm 104 between contacts 128 and 129. Tunable circuit 123 is similarly controlled by boron-beryllium capacitor unit 130, the resistance of which is varied in response to the signal transmitted from sender unit 121.

In addition to the specific embodiment discussed in this example, other capacitor uses of the boron-beryllium material include capacitor modified circuits, e.g., containing chokes and condensers. Similarly, other compositions selected from doped boron-beryllium listed in Table I are also used for such applications.

FIGURE 11 shows still another configuration useful for a capacitor that can be varied by imposing a variable frequency power source thereon through leads 143 and 144. Element 140 represents the modified boron material sandwiched between junction materials 141 and 142. A use for the device of FIGURE 11 is in FIGURE 10 where it is substituted for elements 130 and 131.

*Example 7*

In FIGURE 12, device 158 is a point contact rectifier device of the invention. Body 151 in the shape of a disc is suitably a boron-beryllium material, such as boron containing 6.5 weight percent beryllium and about 0.01 weight percent carbon. For optimum rectifying properties, disc 151 should not be more than about 50 mils thick and preferably not more than about 10 mils thick. The bottom side of disc 151 has been coated with copper, nickel or other metals stipulated herein as electrical junction materials to make ohmic contact therewith and provide a conducting surface for soldering or welding to the disc electrode 152 which is suitably a copper electrode. The upper surface of body 151 is not coated and point contact electrode 153 is suitably a Phosphor-bronze or a tungsten whisker, which is pressed against the upper surface of disc 151 to make electrical contact therewith. Suitably a pressure of about 50 grams of force is used pressing the point contact electrode 153 against the top of disc 151; however, this force might vary from about 10 to about 100 grams more or less, for optimum performance. Suitably, the upper end of whisker 153 is soldered or welded to electrode 164 which is suitably a copper electrode. Surrounding and enclosing disc 151 and point contact electrode 153 is glass capsule 155. Glass-to-metal seals 156 and 157 seal capsule 155 to electrodes 164 and 152, respectively. Such an arrangement as this allows the maintenance of any type of desired atmosphere around disc 151, including high vacuum, if desired. It is very easy to make an opening in the glass capsule to provide the desired atmosphere inside and seal off the opening in the glass to maintain this desired atmosphere. Device 158 is then connected by electrical leads 159 and 160 to an alternating current source 161 to be rectified, and an electrical load 162. Suitably, the direct current voltage resulting from the rectified current flowing in the system will appear across resistor 162. Line 163 connects alternating current source 161 and resistor or load 162 completing the electrical circuit. Suitably, alternating current source 161 can be a 110 volt, 60 cycle source or other alternating current source of higher or lower voltage.

*Example 8*

Figure 13:
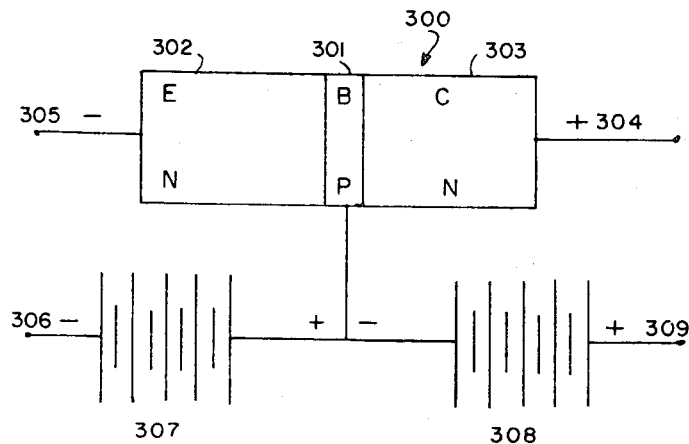
Figure 14:
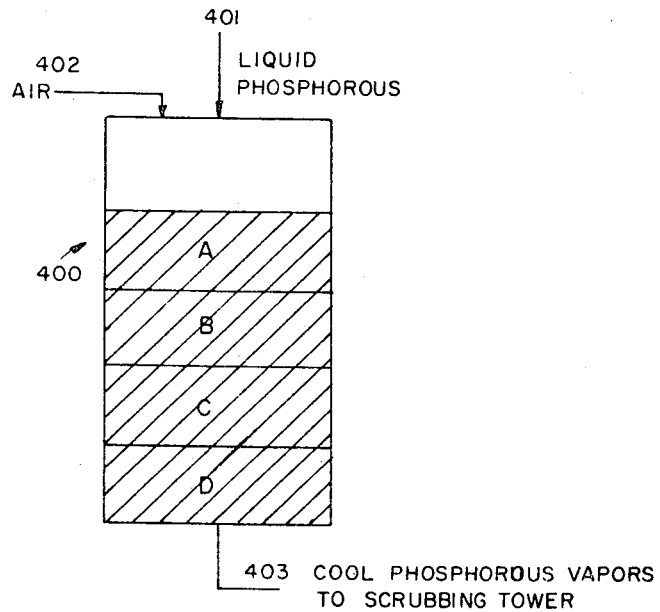

A type of junction transistor 300 consisting of n-type and p-type materials is shown in FIGURE 13. The transistor assembly shown is of the n-p-n-type, but p-n-p-type is also included in the invention. The section 301 between the two end blocks 302 and 303 is called the body, and this forms a common connection between input and output circuits. The emitter is designated by the letter E, the body by B, and the collector by C. Generally, the transistor 300 has its emitter connected to an input terminal 305, and the body connected through a source of power such as a battery 307 to another input terminal 306. The collector 303 of the transistor is connected to an output terminal 304 while the body is connected through a second source of power such as battery 308 to the other output terminal 309. Normally, batteries 307 and 308 will be arranged so that the emitter has a negative polarity with respect to the body, and the collector is positive with respect thereto. However, under certain conditions, it is desirable to reverse the polarities of the batteries 307 and 308. Such a boron-beryllium transistor is useful for amplification purposes or any use where conventional vacuum tubes such as triodes or similar devices are required. Typical compositions found useful for a transistor device shown in FIGURE 13 are:

(1) For n-type material, 0.0001 atom percent lithium in boron-beryllium of 0.06 weight percent of beryllium, (2) For p-type material, 0.00001 atom percent carbon in boron-beryllium of 0.05 weight percent beryllium.

A more complete range of compositions useful for transistor applications is shown in Table I. Boron-beryllium based materials as either p- or n-type semiconductor materials are optionally used in conjunction with known p- or n-type semiconductor materials such as silicon, germanium, silicon carbide, etc. In general, transistors are desirably made with relatively low proportions of dopants, such as from 0.0001 weight percent to 0.10 weight percent. However, higher concentrations ranging upward from $1 \times 10^{-13}$ weight percent to the limits shown in Table I are applicable.

*Example 9*

A specific example of the thermoelectric cooling of the present invention is a phosphorus furnace for the production of phosphoric anhydride, such as is shown in simplified form in FIGURE 14. Here, 400 is a furnace body into which there is directed a stream of white liquid phosphorus 401 and air 402 or other oxygen source. The oxidation of the phosphorus evolves a tremendous amount of heat which must be dissipated.

Prior art methods for removing heat from phosphorus burners have been based upon cooling water sprays, but because of the furnace wall temperatures in excess of 800° C., such methods are costly.

It has now been found that a phosphorus burner having an exit gas stream 403 containing phosphoric anhydride is readily cooled by contacting the said hot gas stream against a surface containing a body of modified boron-beryllium as described above, a preferred material being boron-beryllium of broadly 0.05 weight percent to 17 weight percent beryllium, preferably 0.5 weight percent to 15 weight percent beryllium, and most preferably 1.0 weight percent to 14 weight percent beryllium. A specific material has 10 weight percent beryllium. The body of each boron-beryllium unit A, B, C and D is connected by electrical leads to an external electrical circuit, so that the thermoelectric cooling occurring in the burner body 400 gives an output of electricity. Multiple thermoelectric units are electrically joined for self-cooling using the circuit shown in FIGURE 8, which represents a typical circuit by which a device of the type shown in FIGURE 14 can be used for cooling or power generation as the situation requires. Element 99 of FIGURE 8 represents a battery or power source which, when connected through a switch element 90, can be used to cool elements A, B, C and D when resistance loads 89 and motor load 98 are cut out of the circuit by appropriate switches, elements 90, 95, 96, or 97. When power generation is desired, battery 99 may be cut out of the electrical circuit and either one or both the loads, elements 98 and 89 powered by the electricity generated by heat converted to electrical power with elements A, B, C, and D.

*Example 10*

Figure 4:
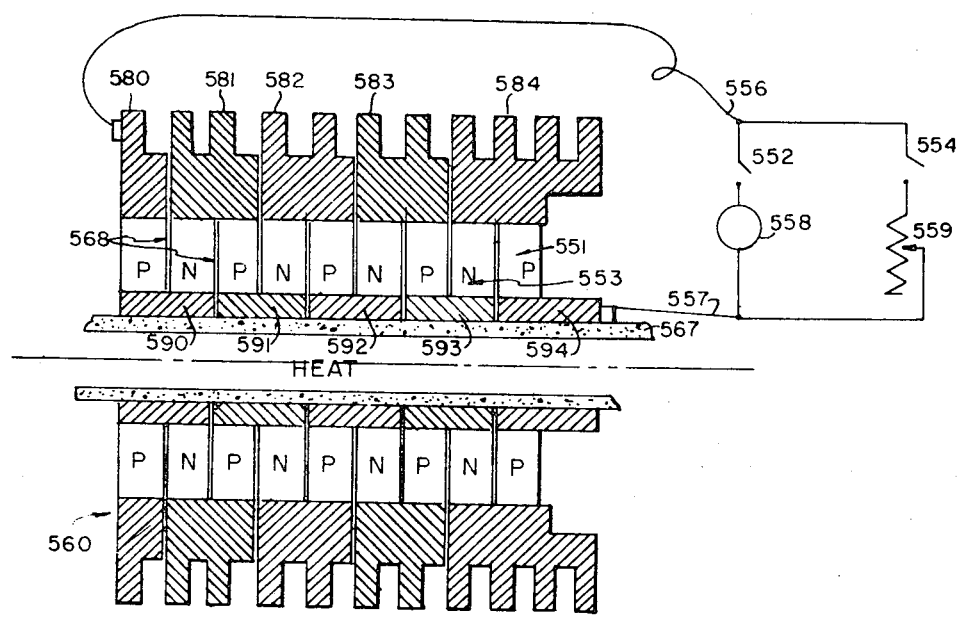

In another embodiment of the invention, p-type (elements 551) and n-type legs (elements 553) are assembled as shown in a cross-sectional view of the device 560 of FIGURE 4. An advantage of this type power generator and cooling device is that a simplified design is possible. Element 567 represents an inner lining of a reactor, exhaust manifold, pipe or other unit which is desirable to cool or from which heat can be absorbed for the purpose of converting to electricity. Element 568 represents an air or vacuum gap or electrically and thermally insulating material between each p- and n-element. Elements 580, 581, 582, 583, and 584 represent individual cold junction sections for each p-n combination. Heat is removed from elements 580, 581, 582, 583, and 584 by convection and radiation cooling. When the unit shown in FIGURE 4 is to serve as an energy converter, load 559 is connected through switch 554, with switch 552 open, to the device 560. With a hot gas or heat source inside element 567, heat flows through the wall of element 567, through the individual hot junction leads, elements 590, 591, 592, 593 and 594, then through each p- and n-leg and thence through the individual cooling sections 580, 581, 582, 583 and 584. When the unit 560 is to be used as a cooling unit, switch 554 is opened and switch 552 is closed connecting unit 560 in series with a power source 558 which causes current to flow in a reverse direction to the case when the unit was producing electric power. The simple p and n legs of the device shown in FIGURE 4 can be replaced with p and n legs of a segmented construction, as typified in Example 4, or with a single boron-beryllium based material for each leg. Bonding of the hot and cold junction materials as well as diffusion barriers between segments of various thermoelectric materials is carried out by the various techniques, e.g., hot-pressing presented herein.

Thermoelectric devices of the type shown in FIGURE 4 are particularly useful for generating power when such a device is installed as a part of the exhaust system of autos, planes, boats, rockets and other systems where waste heat at temperatures in excess of 400° C. is available.

The present patent application is a continuation-in-part of application Serial No. 824,240, filed July 1, 1959.

What is claimed is:

1. A thermoelectric power generating device which generates power at temperatures of from 110° C. to 1950° C. comprising a first element comprising boron in combination with from 0.05 to 17 weight percent of beryllium, and a second element in electrical and thermal contact therewith, the second element being comprised of at least one member of the class consisting of carbon, copper, gold, silver, nickel, cobalt, iron, rehenium, vanadium, rhodium, niobium, titanium, tantalum, ruthenium and the oxides, borides, carbides, silicides and nitrides of nickel, cobalt, iron, rhenium, vanadium, rhodium, niobium, titanium, tantalum and ruthenium, and external leads connected to the respective elements.

2. A thermoelectric power generating device which generates power at temperatures of from 110° C. to 1950° C. comprising a first element comprising boron in combination with from 0.05 to 17 weight percent of beryllium, and a second element in electrical and thermal contact therewith, the second element being comprised of at least one member of the class consisting of carbon, copper, gold, silver, nickel, cobalt, iron, rhenium, vanadium, rhodium, niobium, titanium, tantalum, ruthenium and the oxides, borides, carbides, and nitrides of nickel, cobalt, iron, rhenium, vanadium, rhodium, niobium, titanium, tantalum and ruthenium, the said second element being characterized by an electrical conductivity and a thermal conductivity which are at least equal in magnitude to the respective electrical and thermal conductivities of the aforesaid first element, and means of electrically connecting the respective elements to an external circuit.

3. A device as described in claim 1, in which the said first element also contains dispersed therein at least one additional chemical element in the proportions:

$1 \times 10^{-13}$ to 18 weight percent for Li;

$1 \times 10^{-13}$ to 20 weight percent for Ag, Au, Cu, Pb, P, Sb, As, Bi, S, Se, Te and Po;

$1 \times 10^{-13}$ to 25 weight percent for Sr, Ca, Zn, Al, Ga, In, RE, Y, Sc, Nb, Ta, V, Cr, Mo, W, Mn, Re, Co, Fe, Ni, Ru, Ir and Pd;

$1 \times 10^{-13}$ to 0.04 wt. percent for C, Ge, Ti, Hf, Zr, Sn and Si.

4. A thermoelectric generating material to supply power, the said material consisting of boron containing dispersed therein from 0.05 to 17% by weight of beryllium together with a modifying component selected from the group consisting of carbon, aluminum, zirconium, magnesium, germanium, tin, phosphorus, titanium, hafnium, silicon, cobalt, manganese and the rare earths of type 4f.

5. Process for the production of power which comprises applying heat at temperatures from 110° C. to 1950° C. to one end of a thermoelectric body while cooling the other end thereof, the said body being provided with electrical leads at the hot and cold ends respectively, and the said body being composed of boron having intimately dispersed therein from 0.05 to 17 weight percent beryllium.

6. Process for the production of power which comprises applying heat at temperatures from 110° C. to 1950° C. to one end of a thermoelectric body while cooling the other end thereof, the said body being provided with electrical leads at the hot and cold ends respectively, and the said body being composed of boron having intimately dispersed therein from 0.05 to 17 weight percent of beryllium, and additional chemical elements in the proportions:

$1 \times 10^{-13}$ to 18 weight percent for Li;

$1 \times 10^{-13}$ to 20 weight percent for Ag, Au, Cu, Pb, P, Sb, As, Bi, S, Se, Te and Po;

$1 \times 10^{-13}$ to 25 weight percent for Sr, Ca, Zn, Al, Ga, In, RE, Y, Sc, Nb, Ta, V, Cr, Mo, W, Mn, Re, Co, Fe, Ni, Ru, Ir and Pd;

$1 \times 10^{-13}$ to 0.04 wt. percent for C, Ge, Ti, Hf, Zr, Sn and Si.

7. Process for the production of power which comprises applying heat at temperatures from 110° C. to 1950° C. to one end of a thermoelectric body while cooling the other end thereof, the said body being provided with electrical leads at the hot and cold ends respectively, and the said body being composed of boron having intimately dispersed therein from 0.5 to 17 weight percent of beryllium.

8. A device for generating electric power when in contact with a region of high temperature, said device comprising at least two thermoelectric bodies in electrical series, the first said body being subjected to the highest temperature and comprising boron containing 0.05 to 17 weight percent of beryllium dispersed in the said boron, the first body being in contact with a series of at least another thermoelectric body and external leads connected to the respective bodies.

9. Process for cooling a medium which comprises contacting the said medium with one end of a thermoelectric body composed of boron having dispersed therein from 0.05 to 17 weight percent of beryllium, together with a minor proportion of at least one additional element in the following proportions:

$1 \times 10^{-13}$ to 18 weight percent for Li;
$1 \times 10^{-13}$ to 20 weight percent for Ag, Au, Cu, Pb, P, Sb, As, Bi, S, Se, Te and Po;
$1 \times 10^{-13}$ to 25 weight percent for Sr, Ca, Zn, Al, Ga, In, RE, Y, Sc, Nb, Ta, V, Cr, Mo, W, Mn, Re, Co, Fe, Ni, Ru, Ir and Pd;
$1 \times 10^{-13}$ to 0.04 wt. percent for C, Ge, Ti, Hf, Zr, Sn, Si, the said thermoelectric body having electrical leads connected thereto, and passing a polarized electric current through the said body whereupon the end of the body is cooled and the medium in contact therewith is cooled.

10. A device for generating electric power when in contact with a region of high temperature, said device comprising at least three thermoelectric bodies in electrical series, the first said body being subjected to the highest temperature and comprising boron containing 0.05 to 17 weight percent of beryllium dispersed in the said boron, the first body being in contact with a second thermoelectric body consisting of a boron-carbon containing body, and the second body being in contact with a third thermoelectric body selected from the group consisting of bismuth telluride and lead telluride.

11. Process for cooling a phosphorus burner which comprises contacting elemental phosphorus with oxygen, with the evolution of heat to form a gas stream containing phosphoric anhydride, and contacting the said hot gas stream against a surface containing a body of boron having dispersed therein from 0.05 to 17 weight percent of beryllium, the said body having electrical leads thereon whereby electricity is generated and conducted away from the said body to cool the said surface.

12. Process for producing a body of boron containing from 0.05 to 17 weight percent of beryllium which comprises pressing together powdered boron and beryllium in the desired proportions at a temperature of from 1200° C. to the melting point and a pressure of from 50 to 50,000 p.s.i.

13. Process for producing a body of boron containing from 0.05 to 17 weight percent of beryllium which comprises pressing together powdered boron and beryllium in the desired proportions together with at least one additive in the following proportions:

$1 \times 10^{-13}$ to 18 weight percent for Li;
$1 \times 10^{-13}$ to 20 weight percent for Ag, Au, Cu, Pb, P, Sb, As, Bi, S, Se, Te and Po;
$1 \times 10^{-13}$ to 25 weight percent for Sr, Ca, Zn, Al, Ga, In, RE, Y, Sc, Nb, Ta, V, Cr, Mo, W, Mn, Re, Co, Fe, Ni, Ru, Ir and Pd;
$1 \times 10^{-13}$ to 0.04 wt. percent for C, Ge, Ti, Hf, Zr, Sn, and Si, at a temperature of from 1200° C. to the melting point of the composite mixture and a pressure of from 50 to 50,000 p.s.i.

References Cited in the file of this patent
UNITED STATES PATENTS

| | | |
|---|---|---|
| 1,079,621 | Weintraub | Nov. 25, 1913 |
| 2,059,041 | Schroter et al. | Oct. 27, 1936 |